US011801670B2

(12) United States Patent
Ambroise et al.

(10) Patent No.: US 11,801,670 B2
(45) Date of Patent: Oct. 31, 2023

(54) WHITE, CONFORMABLE FILMS FOR PRESSURE-SENSITIVE-LABELING APPLICATIONS

(71) Applicant: Jindal Films Americas LLC, LaGrange, GA (US)

(72) Inventors: Benoît Ambroise, Nobressart (BE); Daniel L. Hinman, Farmington, NY (US); Robert M. Sheppard, Peachtree City, GA (US); Michael D. Cleckner, Rochester, NY (US)

(73) Assignee: Jindal Films Americas LLC, LaGrange, GA (US)

( * ) Notice: Subject to any disclaimer, the term of this patent is extended or adjusted under 35 U.S.C. 154(b) by 0 days.

(21) Appl. No.: 16/111,351

(22) Filed: Aug. 24, 2018

(65) Prior Publication Data
US 2019/0001648 A1    Jan. 3, 2019

Related U.S. Application Data

(63) Continuation of application No. PCT/US2017/027031, filed on Apr. 11, 2017.

(60) Provisional application No. 62/321,049, filed on Apr. 11, 2016.

(51) Int. Cl.
| | |
|---|---|
| *B32B 27/32* | (2006.01) |
| *C08L 23/12* | (2006.01) |
| *B32B 27/20* | (2006.01) |
| *B32B 7/12* | (2006.01) |
| *B32B 27/30* | (2006.01) |
| *C08L 23/10* | (2006.01) |
| *B32B 27/08* | (2006.01) |
| *B32B 27/16* | (2006.01) |
| *C08L 23/16* | (2006.01) |

(52) U.S. Cl.
CPC ............... *B32B 27/32* (2013.01); *B32B 7/12* (2013.01); *B32B 27/08* (2013.01); *B32B 27/16* (2013.01); *B32B 27/20* (2013.01); *B32B 27/205* (2013.01); *B32B 27/306* (2013.01); *B32B 27/308* (2013.01); *C08L 23/10* (2013.01); *C08L 23/12* (2013.01); *B32B 2250/05* (2013.01); *B32B 2250/242* (2013.01); *B32B 2255/10* (2013.01); *B32B 2255/205* (2013.01); *B32B 2255/24* (2013.01); *B32B 2255/26* (2013.01); *B32B 2255/28* (2013.01); *B32B 2264/0285* (2013.01); *B32B 2264/10* (2013.01); *B32B 2264/102* (2013.01); *B32B 2264/108* (2013.01); *B32B 2274/00* (2013.01); *B32B 2307/21* (2013.01); *B32B 2307/30* (2013.01); *B32B 2307/4026* (2013.01); *B32B 2307/41* (2013.01); *B32B 2307/516* (2013.01); *B32B 2307/518* (2013.01); *B32B 2307/52* (2013.01); *B32B 2307/58* (2013.01); *B32B 2307/72* (2013.01); *B32B 2307/7244* (2013.01); *B32B 2307/7246* (2013.01); *B32B 2307/732* (2013.01); *B32B 2307/744* (2013.01); *B32B 2307/746* (2013.01); *B32B 2307/748* (2013.01); *B32B 2405/00* (2013.01); *B32B 2519/00* (2013.01); *B32B 2553/00* (2013.01); *C08L 23/16* (2013.01)

(58) Field of Classification Search
CPC ......... B32B 27/32; B32B 27/20; B32B 27/08; B32B 27/16; B32B 2405/00; B32B 2307/518; B32B 2307/41; B32B 2553/00; B32B 2519/00; C08L 23/12; C08L 23/16
See application file for complete search history.

(56) References Cited

U.S. PATENT DOCUMENTS

| | | | |
|---|---|---|---|
| 5,492,757 A | 2/1996 | Schumann et al. | |
| 7,537,829 B2 | 5/2009 | Pellingra, Jr. et al. | |
| 8,202,623 B2 | 6/2012 | Dabadie et al. | |
| 8,663,810 B2 | 3/2014 | Ambroise et al. | |
| 9,080,082 B2 | 7/2015 | Thai et al. | |
| 2003/0158307 A1* | 8/2003 | Tsukuda | C08K 5/34 524/236 |
| 2005/0227599 A1* | 10/2005 | Fisher | B24B 23/005 451/526 |
| 2007/0020448 A1* | 1/2007 | Hubbard | B32B 27/36 428/304.4 |
| 2009/0081474 A1 | 3/2009 | Keung | |
| 2009/0304308 A1* | 12/2009 | Townsend | B65D 88/1662 383/24 |
| 2013/0212983 A1 | 8/2013 | Bender et al. | |
| 2019/0315957 A1* | 10/2019 | Soga | H01M 8/0271 |

OTHER PUBLICATIONS

Product Datasheet Exxonmobil PP4712E1 (Year: 2019).*
uben J. Hernandez, Food Packaging Materials, Barrier Properties, and Selection, Handbook of Food Engineering Practice, Chapter 8, 1997, CRC Press, [online] [retrieved on Jun. 8, 2017] [retrieved from the Internet <URL: https://muhammadsubchi.files.wordpress.com/2010/04/handbook-of-food-engineering- practice.pdf> section 8.2.2.

(Continued)

*Primary Examiner* — Samir Shah
(74) *Attorney, Agent, or Firm* — Kearney, McWilliams & Davis; Erik J. Osterrieder

(57) ABSTRACT

A squeezable, white polypropylene film is disclosed having a novel balance of conformability, stiffness, modulus, opacity, and whiteness. The film includes an ABCBA structure having a core layer of polypropylene resin with an elastomeric copolymer and a cavitating agent. Two intermediate layers of polypropylene resin are present on either side, the intermediate layers optionally including an elastomeric copolymer and a pigmenting agent. Two polymer skin layers surround the two intermediate layers. The resins are coextruded into a biaxially oriented film having a thickness between 40 to 70 pm for use in pressure-sensitive labeling applications.

16 Claims, No Drawings

(56) References Cited

OTHER PUBLICATIONS

Lee W. Young, International Search Report and Written Opinion on PCT/US2017/027031, dated Jul. 17, 2017, USPTO, Alexandria, VA.
Erik J. Osterrieder, Article 19 Amendments and Response to International Search Report and Written Opinion on PCT/US2017/027031, dated Aug. 29, 2017, Houston, TX.

* cited by examiner

WHITE, CONFORMABLE FILMS FOR PRESSURE-SENSITIVE-LABELING APPLICATIONS

REFERENCE TO RELATED APPLICATION

This application claims priority to applications PCT/US17/27031 filed 11 Apr. 2017 and U.S. provisional Ser. No. 62/321,049 filed 11 Apr. 2016, the contents of which are herein incorporated by this reference in their entireties.

FIELD

This disclosure relates generally to a white, conformable film for use in pressure-sensitive labeling applications.

BACKGROUND

Pressure sensitive labels (PSL) are used in a wide variety of label applications. One of the most common is labeling semi-rigid or plastic containers or tubes that are frequently squeezed during consumer uses, such as health and beauty products (shampoo, lotion, toothpaste) and food (salad dressing, condiments). Conformable labels may also be needed to smoothly apply to a contoured container or bottle having an irregular shape.

Currently, polyethylene and modified polypropylene films are used. The drawback of polyethylene is that it is quite soft and requires high thickness to compensate for a low stiffness (or modulus). Polypropylene requires high levels of polyethylene or polypropylene block copolymers which may cause undesirable physical properties.

An opaque, white film can be produced by adding $TiO_2$ pigment to one or more layers of the film structure. Another technique consists of cavitating one or more layers of the film with a cavitating agent such as polybutylene terephthalate (PBT) or calcium carbonate ($CaCO_3$). However, these techniques also affect the strength of the film (in the case of cavitating) or result in an expensive, high density film (pigmenting).

A need therefore exists for a PSL film having balanced properties of conformability, stiffness, modulus, opacity, and whiteness.

SUMMARY

It has been discovered that squeezable, conformable, white labels can be made by using polypropylene and a propylene-based copolymer (elastomer) in a 3-5 layer (or more) co-extruded film structure. A combination of elastomer and cavitation has been discovered which yields conformable white labels that do not suffer from the adverse effects of squeeze testing, such as creasing or other visual wear. The stiffness and modulus are suitable for PSL converting operations including die cutting and label dispensing. Surprisingly, in spite of the general rule that cavitated films are less conformable (more prone to folds and wrinkles), a cavitated film with the right composition as disclosed below may outperform plain films or pigmented films.

DETAILED DESCRIPTION

Below, directional terms, such as "above," "below," "upper," "lower," "front," "back," "top," "bottom," etc., are used for convenience in referring to the accompanying drawings. In general, "above," "upper," "upward," "top," and similar terms refer to a direction away the earth's surface, and "below," "lower," "downward," "bottom," and similar terms refer to a direction toward the earth's surface, but is meant for illustrative purposes only, and the terms are not meant to limit the disclosure.

Various specific embodiments, versions and examples are now be described, including exemplary embodiments and definitions that are adopted herein for purposes of understanding. While the following detailed description gives specific embodiments, those skilled in the art will appreciate that these embodiments are exemplary only, and that the disclosure can be practiced in other ways. For purposes of determining infringement, the scope of the invention will refer to the any claims, including their equivalents, and elements or limitations that are equivalent to those that are recited.

This disclosure provides, at least in one aspect, propylene-based copolymers and elastomers in polypropylene films with the right balance of stiffness, e.g., for cutting, and conformability, i.e., for squeezability, that are cavitated, white-opaque, conformable films, wherein the label is a type of film that includes at least one adhesive exterior surface and optionally a release substrate. In other example embodiments, the cavitated, white-opaque, conformable films, may be polymers and copolymers of olefins, polyester, and/or blends thereof having sufficient thickness to balance cutting with squeezability.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "elastomer" is defined as a propylene-based or ethylene-based copolymer that can be extended or stretched with force to at least 100% of its original length, and upon removal of the force, rapidly (e.g., within 5 seconds) returns to its original dimensions.

Turning now to example embodiments, below are films produced at a target of 52 micrometers in thickness prior to cavitation. Films having other thicknesses, e.g., in the range of 40 to 70 µm, may be used instead. The resins themselves were melted and combined in a T-die for co-extruding films that were cooled on a chill roll and then stretched to approximately 4.6 times in the machine direction at a temperature of 225° F. (107° C.), and to approximately 9.6 times in the transverse direction at a temperature of 322 to 330° F. (161 to 166° C.). In other example embodiments not depicted below, coextruded films may be stretched more or less in either or both the machine and transverse directions at various temperatures. In still further example embodiments, the cavitated, white-opaque, conformable films may be blown or cast films.

Example 1 (Clear Conformable)

BW-120412-01

TABLE 1

| Resin Blend | Thickness |
| --- | --- |
| JPP-XPM7510 | 1 μm |
| 20% Vistamaxx 6102<br>80% XOM 4712 | 6 μm |
| 20% Vistamaxx 6102<br>80% XOM 4712 | 38 μm |
| 20% Vistamaxx 6102<br>80% XOM 4712 | 6 μm |
| JPP-XPM7510 | 1 μm |

Example 2 (Non-Cavitated White Conformable)

BW-120412-02

TABLE 2

| Resin Blend | Thickness |
| --- | --- |
| JPP-XPM7510 | 1 μm |
| 20% Vistamaxx 6102<br>67% XOM 4712<br>13% Ampacet 510198 | 6 μm |
| 20% Vistamaxx 6102<br>67% XOM 4712<br>13% Ampacet 510198 | 38 μm |
| 20% Vistamaxx 6102<br>67% XOM 4712<br>13% Ampacet 510198 | 6 μm |
| JPP-XPM7510 | 1 μm |

Example 3 (Non-Cavitated White Conformable)

BW-120412-03

TABLE 3

| Resin Blend | Thickness |
| --- | --- |
| JPP-XPM7510 | 1 μm |
| 20% Vistamaxx 6102<br>60% XOM 4712<br>20% Ampacet 510198 | 6 μm |
| 20% Vistamaxx 6102<br>69% XOM 4712<br>11% Ampacet 510198 | 38 μm |
| 20% Vistamaxx 6102<br>60% XOM 4712<br>20% Ampacet 510198 | 6 μm |
| JPP-XPM7510 | 1 μm |

Example 4 (Non-Cavitated White Conformable)

BW-120512-02

TABLE 4

| Resin Blend | Thickness |
| --- | --- |
| JPP-XPM7510 | 1 μm |
| 100% XOM 4612 | 3 μm |
| 97% XOM 4612<br>3% Valox 195 | ~63 μm<br>(cavitated) |
| 100% XOM 4612 | 3 μm |
| JPP-XPM7510 | 1 μm |

Example 5 (Cavitated White Conformable)

BW-120512-04

TABLE 5

| Resin Blend | Thickness |
| --- | --- |
| JPP-XPM7510 | 1 μm |
| 100% XOM 4612 | 3 μm |
| 20% Vistamaxx 6102<br>70% XOM 4612<br>10% Valox 195 | ~59 μm<br>(cavitated) |
| 100% XOM 4612 | 3 μm |
| JPP-XPM7510 | 1 μm |

Example 6 (Cavitated White Conformable)

BW-120512-05

TABLE 6

| Resin Blend | Thickness |
| --- | --- |
| JPP-XPM7510 | 1 μm |
| 20% Vistamaxx 6102<br>75% XOM 4712<br>5% Ampacet 510198 | 3 μm |
| 20% Vistamaxx 6102<br>70% XOM 4612<br>10% Valox 195 | ~59 μm<br>(cavitated) |
| 20% Vistamaxx 6102<br>75% XOM 4712<br>5% Ampacet 510198 | 3 μm |
| JPP-XPM7510 | 1 μm |

In these example films 1-6, the core included a propylene-based copolymer, i.e., an elastomer, such as Vistamaxx 6102 available from ExxonMobil. It can be appreciated that other elastomers may be used without departing from the scope of the invention. This elastomer may be present in a range between 10 wt % to 50 wt % but is preferably close to 20 wt %. A possible cavitating agent is polybutylene terephthalates ("PBT"), such as Valox 195. In additional and alternative embodiments. $CaCO_3$ or other polymeric and/or mineral cavitating agents may be used. A possible white pigment for use is $TiO_2$, which may be sourced from a masterbatch, such as Ampacet 510198 (AVK 60), which is a 60% blend of $TiO_2$ in polypropylene; other pigmenting agents may be used without departing from the scope of the invention. This pigment may be present in a layer at up to 30 wt % depending on the desired level of opacity. Standard grades of a polypropylene homopolymer may be used in the core and/or tie layers. Terpolymer skins, e.g., JPP-XPM7510 ethylene-propylene-butylene terpolymer, may be used, but other polymers and/or copolymers may be used, including, for example, EP copolymers, LDPE, LLDPE, MDPE, HDPE, EVOH-based polymers, acrylic-based polymers, maleic anhydride-based polymers, elastomers, other polymers, and blends thereof. In Table 7, a summary of physical properties for films in Examples 1-6 are provided.

TABLE 7

| Property | Units | Example 1 | Example 2 | Example 3 | Example 4 | Example 5 | Example 6 |
|---|---|---|---|---|---|---|---|
| Description | | Clear | Uncavitated White | Uncavitated White | Cavitated White | Cavitated White | Cavitated White |
| Yield | in²/lb | 14,996 | 14,308 | 14,474 | 14,738 | 14,802 | 14,906 |
| | m²/kg | 21.3 | 20.4 | 20.6 | 21.0 | 21.1 | 21.2 |
| Poly Gauge | mils | 2.06 | 2.04 | 2.01 | 2.07 | 2.04 | 2.02 |
| | μm | 52.4 | 51.7 | 51.1 | 52.6 | 51.7 | 51.2 |
| Optical Gauge | mils | 2.11 | 2.12 | 2.05 | 2.79 | 2.64 | 2.66 |
| | μm | 53.6 | 53.8 | 52.1 | 70.9 | 67.1 | 67.6 |
| Film Density | gm/cm³ | 0.87 | 0.91 | 0.93 | 0.67 | 0.71 | 0.70 |
| Light Transmission | % | 92.6 | 31.4 | 30.0 | 23.4 | 33.7 | 30.5 |
| Opacity | % | n/a | 77.4 | 79.2 | 82.0 | 73.8 | 79.4 |
| Whiteness Index | | n/a | 107.2 | 104.2 | 83.8 | 81.8 | 89.0 |
| Gloss @ 45° | | 46.7 | 38.2 | 37.4 | 88.3 | 57.7 | 44.8 |
| MD Stiffness (Gurley) | Mg | 6 | 6 | 5 | 25 | 13 | 11 |
| TD Stiffness (Gurley) | Mg | 12 | 12 | 10 | 44 | 20 | 14 |
| MD Stiffness (Handle-o-Meter) | g/15 cm | 39 | 37 | 35 | 132 | 84 | 65 |
| TD Stiffness (Handle-o-Meter) | g/15 cm | 72 | 62 | 61 | 189 | 108 | 75 |
| MD Young's Modulus | ksi | 105 | 106 | 115 | 163 | 123 | 98 |
| TD Young's Modulus | ksi | 184 | 165 | 167 | 237 | 190 | 135 |
| Squeeze | | 2.1 | 2.1 | 2.8 | 2.2 | 2.1 | 2.1 |
| Performance | | No creasing | No creasing | No creasing | Heavy creasing | No creasing | No creasing |

With regard to the last row of Table 7, squeezability was measured for Examples 1-6. Here, the squeezability protocol included hand-labeling bottles with piggyback adhesive laminations prior to testing. Two containers of each bottle and label combination were automatically deflated and inflated with squeeze testing equipment, wherein automation to the same setting removes variability among each testing sample. After ten cycles of deflation/inflation, each sample was analyzed and rated based on the scale in Table 8.

TABLE 8

| Ratings: | | Result: |
|---|---|---|
| 0 | Bottle did not compress | N/A |
| 1 | No defect | Acceptable |
| 2 | Slight defect | Marginal |
| 3 | Minor defect | Unacceptable |
| 4-5 | Unacceptable | |

The squeeze testing results showed, for example, that Example 4 had poor squeezability performance due to heavy creasing. Example 5 had excellent whiteness, gloss, and squeezability performance. And, Example 6 had very good squeezability performance, but less glossy than Example 5. Given the trend for more-contoured containers being present in the marketplace, the disclosed technology provides, at least in one respect, white, conformable, PSL technology for various applications that have the cost advantage over non-cavitated films by enabling a higher yield, i.e., more square meters of film per kilogram of film, while maintaining other properties required or desired for fitness-for-use purposes.

As used herein, "polymer" may be used to refer to homopolymers, copolymers, interpolymers, terpolymers, etc. Likewise, a "copolymer" may refer to a polymer comprising two monomers or to a polymer comprising three or more monomers.

As used herein, "intermediate" is defined as the position of one layer of a multilayered film wherein said layer lies between two other identified layers. In some embodiments, the intermediate layer may be in direct contact with either or both of the two identified layers. In other embodiments, additional layers may also be present between the intermediate layer and either or both of the two identified layers.

As used herein, "substantially free" is defined to mean that the referenced film layer is largely, but not wholly, absent a particular component. In some embodiments, small amounts of the component may be present within the referenced layer as a result of standard manufacturing methods, including recycling of film scraps and edge trim during processing.

Core Layer

As is known to those skilled in the art, the core layer of a multilayered film is most commonly the thickest layer and provides the foundation of the multilayered structure. In some embodiments, the core layer includes PP. In alternate embodiments, the core may also contain lesser amounts of additional polymer(s) selected from the group consisting of propylene polymer, ethylene polymer, ethylene-propylene copolymers, ethylene-propylene-butene terpolymers, elastomers, plastomers, and combinations thereof. Although not limiting in any way, two examples of suitable LLDPE were: (1) one with a melting index of 1 to 3 g/10 min (measured at 190° C.-2.13 Kg conditions), a density of 0.915 to 0.930 g/cm³, and a melting peak of 115 to 135° C.

In addition to the foregoing, the core layer may further comprise one or more additional additives such as opacifying agents, colorants, slip agents, antioxidants, anti-fog agents, anti-static agents, fillers, moisture barrier additives, gas barrier additives, and combinations thereof, as discussed in further detail below. A suitable anti-static agent is ARMOSTAT™ 475 (commercially available from Akzo Nobel of Chicago, Ill.).

Cavitating agents may be present in the core layer in an amount less than 30 wt %, preferably less than 20 wt %, most preferably in the range of from 2 wt % to 10 wt %, based on the total weight of the core layer.

Preferably, the total amount of additives in the core layer comprises up to about 20 wt % of the core layer, but some embodiments may comprise additives in the core layer in an amount up to about 30 wt % of the core layer.

The core layer preferably has a thickness in the range of from about 5 µm to 100 µm, more preferably from about 5 µm to 50 µm, most preferably from 5 µm to 25 µm.

Tie Layer(s)

Tie layer(s) of a multilayered film is typically used to connect two other layers of the multilayered film structure, e.g., a core layer and a sealant layer, and is positioned intermediate these other layers. The tie layer(s) may have the same or a different composition as compared to the core layer.

In some embodiments, the tie layer is in direct contact with the surface of the core layer. In other embodiments, another layer or layers may be intermediate the core layer and the tie layer. The tie layer may comprise one or more polymers. In addition, the polymers may include $C_2$ polymers. $C_3$ polymers, $C_2C_3$ random copolymers, $C_2C_3C_4$ random terpolymers, heterophasic random copolymers, $C_4$ homopolymers, $C_4$ copolymers, metallocene polymers, propylene-based or ethylene-based elastomers and/or plastomers, or combinations thereof.

In some embodiments, the tie layer may further comprise one or more additives such as opacifying agents, pigments, colorants, cavitating agents, slip agents, antioxidants, anti-fog agents, anti-static agents, anti-block agents, fillers, moisture barrier additives, gas barrier additives, and combinations thereof, as discussed in further detail below.

The thickness of the tie layer is typically in the range of from about 0.50 to 25 µm, preferably from about 0.50 µm to 12 µm, more preferably from about 0.50 µm to 6 µm, and most preferably from about 2.5 µm to 5 pun. However, in some thinner films, the tie layer thickness may be from about 0.5 µm to 4 µm, or from about 0.5 µm to 2 µm, or from about 0.5 µm to 1.5 µm.

A skin layer is optional, and, when present, is provided on the outer surface(s) surface of the tie layer(s) or core layer. Skin layer(s) may be provided to improve the film's barrier properties, processability, printability, and/or compatibility for metallization, coating, and lamination to other films or substrates.

In some embodiments, the skin layer comprises at least one polymer selected from the group consisting of a polyethylene polymer or copolymer, a polypropylene polymer or copolymer, an ethylene-propylene copolymer, an ethylene-propylene-butene ("EPB") terpolymer, a propylene-butene copolymer, an ethylene-vinyl alcohol polymer, and combinations thereof. Preferably, the polyethylene polymer is LLDPE such as Exceed™ resin from ExxonMobil Chemicals or Evolue™ resin from Prime Polymer or Elite™ resin from Dow. A suitable ethylene-propylene copolymer is Total 8573 (commercially available from Total Petrochemicals, USA, Inc. of Houston, Texas). Suitable EPB terpolymers are XPM7510 and XPM7794 (commercially available from Japan Polypropylene Corporation of Japan). For coating and printing functions, the skin layer may preferably be surface-treated. For metallizing or barrier properties, the skin layer may contain LLDPE or ethylene vinyl alcohol based polymer(s) ("EVOH"). Suitable EVOH copolymer is EVAL™ G176B or XEP 1300 (commercially available from Kuraray Company Ltd. of Japan).

The skin layer may also comprise processing aid additives, such as anti-block agents, anti-static agents, slip agents and combinations thereof, as discussed in further detail below.

The thickness of the skin layer depends upon the intended function of the skin layer, but is typically in the range of from about 0.50 µm to 3.5 µm, preferably from about 0.50 µm to 2 µm, and in many embodiments most preferably from about 0.50 µm to 1.5 µm. Also, in thinner film embodiments, the skin layer thickness may range from about 0.50 µm to 1.0 µm, or 0.50 µm to 0.75 µm.

Coating

In some embodiments, one or more coatings, such as for barrier, printing and/or processing, may be applied to outer surface(s) of the multilayered films. For instance, the coating (s) may be directly on the outer surfaces (i.e., those surfaces facing away from the core) of tie layers, on either or both sides of the core layer, or elsewhere. Such coatings may include acrylic polymers, such as ethylene acrylic acid (EAA), ethylene methyl acrylate copolymers (EMA), polyvinylidene chloride (PVdC), poly(vinyl)alcohol (PVOH) and EVOH. The coatings may be applied by an emulsion or solution coating technique or by co-extrusion and/or lamination.

The PVdC coatings that may be suitable for use with the multilayered films are any of the known PVdC compositions heretofore employed as coatings in film manufacturing operations, e.g., any of the PVdC materials described in U.S. Pat. No. 4,214,039, U.S. Pat. No. 4,447,494, U.S. Pat. No. 4,961,992, U.S. Pat. No. 5,019,447, and U.S. Pat. No. 5,057,177, incorporated herein by reference.

Known vinyl alcohol-based coatings, such as PVOH and EVOH, that are suitable for use with the multilayered films include VINOL™ 125 or VINOL™ 325 (both commercially available from Air Products, Inc. of Allentown, Pa.). Other PVOH coatings are described in U.S. Pat. No. 5,230,963, incorporated herein by reference.

Before applying the coating composition to the appropriate substrate, the outer surface(s) of the film may be treated as noted herein to increase its surface energy. This treatment can be accomplished by employing known techniques, such as flame treatment, plasma, corona discharge, film chlorination, e.g., exposure of the film surface to gaseous chlorine, treatment with oxidizing agents such as chromic acid, hot air or steam treatment, flame treatment and the like. Although any of these techniques is effectively employed to pre-treat the film surface, a frequently preferred method is corona discharge, an electronic treatment method that includes exposing the film surface to a high voltage corona discharge while passing the film between a pair of spaced electrodes. After treatment of the film surface, the coating composition is then applied thereto.

Coating compositions may be applied to the film as a water-based solution. The coating composition may be applied to the treated surface in any convenient manner, such as by gravure coating, roll coating, dipping, spraying, and the like. The excess aqueous solution can be removed by squeeze rolls, doctor knives, and the like.

Additives

Additives that may be present in one or more layers of the multilayered films, include, but are not limited to opacifying agents, pigments, colorants, cavitating agents, slip agents, antioxidants, anti-fog agents, anti-static agents, anti-block agents, fillers, moisture barrier additives, gas barrier additives and combinations thereof. Such additives may be used in effective amounts, which vary depending upon the property required. Additives such as oxygen scavenger or gas scavenger can be added in any layer.

Slip agents may include higher aliphatic acid amides, higher aliphatic acid esters, waxes, silicone oils, and metal soaps. Such slip agents may be used in amounts ranging from 0.1 wt % to 2 wt % based on the total weight of the layer to which it is added. An example of a slip additive that may be useful is high molecular PDSM (poly dimethyl siloxane) silicone gum.

Non-migratory slip agents, used in one or more skin layers of the multilayered films, may include polymethyl methacrylate (PMMA). The non-migratory slip agent may have a mean particle size in the range of from about 0.5 µm to 8 µm, or 1 µm to 5 µm, or 2 µm to 4 µm, depending upon layer thickness and desired slip properties. Alternatively, the size of the particles in the non-migratory slip agent, such as PMMA, may be greater than 20% of the thickness of the skin layer containing the slip agent, or greater than 40% of the thickness of the skin layer, or greater than 50% of the thickness of the skin layer. The size of the particles of such non-migratory slip agent may also be at least 10% greater than the thickness of the skin layer, or at least 20% greater than the thickness of the skin layer, or at least 40% greater than the thickness of the skin layer. Generally spherical, particulate non-migratory slip agents are contemplated, including PMMA resins, such as EPOSTAR™ (commercially available from Nippon Shokubai Co., Ltd. of Japan). Other commercial sources of suitable materials are also known to exist. Non-migratory means that these particulates do not generally change location throughout the layers of the film in the manner of the migratory slip agents. A conventional polydialkyl siloxane, such as silicone oil or gum additive having a viscosity of 10,000 to 2,000,000 centistokes is also contemplated.

Suitable anti-oxidants may include phenolic anti-oxidants, such as IRGANOX® 1010 (commercially available from Ciba-Geigy Company of Switzerland). Such an anti-oxidant is generally used in amounts ranging from 0.1 wt % to 2 wt %, based on the total weight of the layer(s) to which it is added.

Anti-static agents may include alkali metal sulfonates, polyether-modified polydiorganosiloxanes, polyalkylphenylsiloxanes, and tertiary amines. Such anti-static agents may be used in amounts ranging from about 0.05 wt % to 3 wt %, based upon the total weight of the layer(s).

Examples of suitable anti-blocking agents may include silica-based products such as SYLOBLOC® 44 (commercially available from Grace Davison Products of Colombia, Md.), PMMA particles such as EPOSTAR™ (commercially available from Nippon Shokubai Co., Ltd. of Japan), or polysiloxanes such as TOSPEARL™ (commercially available from GE Bayer Silicones of Wilton, Conn.). Such an anti-blocking agent comprises an effective amount up to about 3000 ppm of the weight of the layer(s) to which it is added.

Useful fillers may include finely divided inorganic solid materials such as silica, fumed silica, diatomaceous earth, calcium carbonate, calcium silicate, aluminum silicate, kaolin, talc, bentonite, clay and pulp.

Suitable moisture and gas barrier additives may include effective amounts of low-molecular weight resins, hydrocarbon resins, particularly petroleum resins, styrene resins, cyclopentadiene resins, and terpene resins.

Optionally, one or more skin layers may be coated with a wax-containing coating, for lubricity, in amounts ranging from 2 wt % to 15 wt % based on the total weight of the skin layer. Any conventional wax, such as, but not limited to Carnauba™ wax (commercially available from Michelman Corporation of Cincinnati, Ohio) that is useful in thermoplastic films is contemplated.

Orientation

The embodiments include possible uniaxial or biaxial orientation of the multilayered films. Orientation in the direction of extrusion is known as machine direction (MD) orientation. Orientation perpendicular to the direction of extrusion is known as transverse direction (TD) orientation. Orientation may be accomplished by stretching or pulling a film first in the MD followed by TD orientation. Blown films or cast films may also be oriented by a tenter-frame orientation subsequent to the film extrusion process, again in one or both directions. Orientation may be sequential or simultaneous, depending upon the desired film features. Preferred orientation ratios are commonly from between about three to about six times the extruded width in the machine direction and between about four to about ten times the extruded width in the transverse direction. Typical commercial orientation processes are BOPP tenter process, blown film, and LISIM technology.

Surface Treatment

One or both of the outer surfaces of the multilayered films, and, in particular, the sealant layers, may be surface-treated to increase the surface energy to render the film receptive to metallization, coatings, printing inks, and/or lamination. The surface treatment can be carried out according to one of the methods known in the art including corona discharge, flame, plasma, chemical treatment, or treatment by means of a polarized flame.

Metallization

Outer surface(s) (i.e., the side facing away from the core) of the multilayered films may be metallized and optionally coated thereafter. For example, outer surfaces of the sealant layers and/or skin layers may undergo metallization after optionally being treated. Metallization may be carried out through conventional methods, such as vacuum metallization by deposition of a metal layer such as aluminum, copper, gold, silver, zinc, chromium, or mixtures thereof, or any other metallization technique, such as electroplating or sputtering. Typically, a metal layer is applied to an optical density (OD) of from 1.5 to 5.0 or preferably from 1.8 to 4.0, in accordance with the standard procedure of ANSI/NAPM IT2.19.

In certain embodiments, the metal is metal oxide, any other inorganic materials, or organically modified inorganic materials, which are capable of being vacuum deposited, electroplated or sputtered, such as, for example, $SiO_x$, $AlO_x$, $SnO_x$, $ZnO_x$, $IrO_x$, organically modified ceramics "ormocer", etc. Here an integer x is 1 or 2. The thickness of the deposited layer is typically in the range from 100 to 5,000 Å or preferably from 300 to 3000 Å.

Priming

A primer coating may be applied to any surface of the multilayered films. In this case, the film may be first treated by one of the foregoing methods to provide increased active adhesive sites thereon and to the thus-treated film surface there may be subsequently applied a continuous or non-continuous coating of a primer material. Unlike continuous, non-continuous coating may only coat areas that will require ink imaging or adhesive application in some specific applications. Such primer materials are well known in the art and include, for example, epoxy and poly(ethylene imine) (PEI) materials. U.S. Pat. Nos. 3,753,769, 4,058,645 and 4,439,493, each incorporated herein by reference, disclose the use and application of such primers. The primer provides an overall adhesively active surface for thorough and secure bonding with the subsequently applied coating composition and can be applied to the film by conventional solution coating means, for example, by roller application.

The films herein are also characterized in certain embodiments as being biaxially oriented, such as by the procedure described in U.S. Pat. No. 8,080,294, incorporated herein by this reference. The films may be made by any suitable technique known in the art, such as a tenter process, double bubble process, LISIM™, or others. Further, the working conditions, temperature settings, lines speeds, etc. will vary depending on the type and the size of the equipment used. Nonetheless, described generally here is one method of making the films described throughout this disclosure. In one particular embodiment, the films are formed and biaxially oriented using the "tentered" method. In the tenter process, sheets/films of the various materials are melt-blended and coextruded, such as through a 3, 4, 5, 7-layer die head, into the desired film structure. Extruders may be used to melt-blend the molten layer materials, the melt streams then metered to the die. The extruded sheet is then cooled using air, water, or both.

Downstream of the first cooling step in this example embodiment of the tentered process, the unoriented sheet is re-heated to a temperature of from 60 to 100 or 120 or 150° C. by any suitable means, such as heated S-wrap rolls, and then passed between closely spaced differential speed rolls to achieve machine-direction orientation. It is understood by those skilled in the art that this temperature range may vary depending upon the equipment, and, in particular, upon the identity and composition of the components constituting the film. Ideally, the temperature will be below that which will melt the film, or cause it to become tacky and adhere to the equipment, but high enough to facilitate the machine-direction orientation process. Notably, such temperatures referred to herein refer to the film temperature, itself. The film temperature may be measured by using, for example, infrared spectroscopy, the source being aimed at the film as it is being processed; those skilled in the art will understand that measuring the actual film temperature may not be precise and/or fully accurate. In this case, those skilled in the an may estimate the temperature of the film by knowing the temperature of the air or roller immediately adjacent to the film that is measured by any suitable means. The heating means for the film line may be set at any appropriate level of heating, depending upon the instrument, to achieve the stated or desired film temperatures.

Subsequently, the lengthened and thinned film is cooled and passed to the tenter section of the line for TD orientation. At this point, the edges of the sheet are grasped by mechanical clips on continuous chains and pulled into a long, precisely controlled, hot-air oven for a pre-heating step. The film temperatures may range from 80 or 110 to 150 or 160° C. in the pre-heating step. Again, the temperature is ideally below that which will melt the film, but high enough to facilitate the step of transverse-direction orientation. Next, the edges of the sheet are grasped by mechanical clips on continuous chains and pulled into a long, precisely controlled, hot-air oven for transverse stretching. The tenter chains diverge a desired amount to stretch the film in the transverse direction at a temperature high enough to facilitate the step of transverse-direction orientation but low enough so as not to melt the film. After stretching to the required transverse orientation, the film is then cooled from 5 to 10 or 15 or 20 or 30 or 40° C. below the stretching temperature, and the mechanical clips are released prior to any edge trimming. Thereafter, optional corona or any other treatment may take place followed by winding.

Thus, in certain embodiments the film(s) described herein are biaxially oriented with at least a 5 or 6 or 7 or 8-fold TD orientation and at least a 2 or 3 or 4-fold MD orientation.

The prepared multilayered films may be used in PSL applications on packages or other substrates that package articles or goods or serve as a printable surface for labeling products. While the foregoing is directed to example embodiments of the disclosed invention, other and further embodiments may be devised without departing from the basic scope thereof, wherein the scope of the disclosed apparatuses, systems and methods are determined by one or more claims.

While the foregoing is directed to example embodiments of the disclosed invention, other and further embodiments may be devised without departing from the basic scope thereof, wherein the scope of the disclosed apparatuses, systems and methods are determined by one or more claims.

What is claimed is:

1. A biaxially oriented, conformable, multilayer film comprising:
   a core layer consisting of: (i) polypropylene, (ii) between 10 and 50 wt. % propylene-based elastomer, and (iii) a cavitating agent consisting of polybutylene terephthalates, calcium carbonate, zeolite, cyclic olefin polymers or copolymers, glass beads, polymeric and/or mineral cavitating agents, and combinations thereof, wherein the core layer having a first side and a second side;
   a first and second intermediate layers located on the first and second side, respectively, of the core layer, wherein the first and second intermediate layers consist of: (i) polypropylene homopolymer, and optionally, a pigmenting agent; and
   a first and second skin layers, located on the first and second intermediate layers, respectively,
   wherein the biaxially oriented, conformable, multilayer film is white-opaque, has a film density of less than 0.71 g/cm$^3$ and a light transmission of 30.5% to 92.6%,
   wherein the biaxially oriented, conformable, multilayer film exhibits no creasing after ten cycles of deflation and inflation.

2. The biaxially oriented, conformable, multilayer film of claim 1, wherein the biaxially oriented, conformable, multilayer film comprises a yield greater than 21 m$^2$/kg.

3. The biaxially oriented, conformable, multilayer film of claim 1, wherein the first and second skin layers comprise an ethylene-propylene-butylene terpolymer, an ethylene-propylene copolymer, polyethylene, ethyl vinyl alcohol based copolymers, acrylic based polymers, maleic anhydride based polymers, or blends thereof.

4. The biaxially oriented, conformable, multilayer film of claim 1, wherein the pigmenting agent is in both of the first and second intermediate layers.

5. The biaxially oriented, conformable, multilayer film of claim 1, wherein the biaxially oriented, conformable, multilayer film comprises a total thickness between 40 μm and 70 μm.

6. The biaxially oriented, conformable, multilayer film of claim 1, wherein the biaxially oriented, conformable, multilayer film additionally comprises more than one tie layer between the core layer and the first intermediate layer, the second intermediate layer, or both.

7. The biaxially oriented, conformable, multilayer film of claim 1, wherein the biaxially oriented, conformable, multilayer film comprises an optical gauge over 60 μm.

8. The biaxially oriented, conformable, multilayer film of claim 1, wherein the cavitating agent is present at up to 30 wt. % in the core layer.

9. The biaxially oriented, conformable, multilayer film of claim 1, wherein the pigmenting agent is present at up to 5 wt. % in the first intermediate layer and the second intermediate layer.

10. The biaxially oriented, conformable, multilayer film of claim 1, wherein at least one of the core layer, first intermediate layer, second intermediate layer, first skin layer, or second skin layer is coated with a polymer comprising ethylene acrylic acid, ethylene methyl acrylate copolymer, polyvinylidene chloride, polyvinyl alcohol, ethyl vinyl alcohol, or combinations thereof.

11. The biaxially oriented, conformable, conformable, multilayer of claim 1, wherein at least one of the first skin layer or the second skin layer is subjected to corona discharge treatment, flame treatment, polarized flame treatment, plasma treatment, chemical treatment, or combinations thereof.

12. The biaxially oriented, conformable, multilayer film of claim 1, wherein at least one of the first skin layer and the second skin layer is metallized.

13. The biaxially oriented, conformable, multilayer film of claim 1, wherein the biaxially oriented, conformable, multilayer film is a squeezable packaging.

14. The biaxially oriented, conformable, multilayer film of claim 1, wherein the biaxially oriented, conformable, multilayer film is a label capable of receiving at least one adhesive on an exterior surface, and, optionally, a release substrate.

15. The biaxially oriented, conformable, multilayer film of claim 1, wherein the propylene-based elastomer in the core layer is between 20 and 50 wt. %.

16. The biaxially oriented, conformable, multilayer film of claim 1, wherein the pigmenting agent is in a propylene blend.

* * * * *